Feb. 22, 1938.   W. H. FRICK   2,109,382
OVEN
Filed March 10, 1937   3 Sheets-Sheet 1
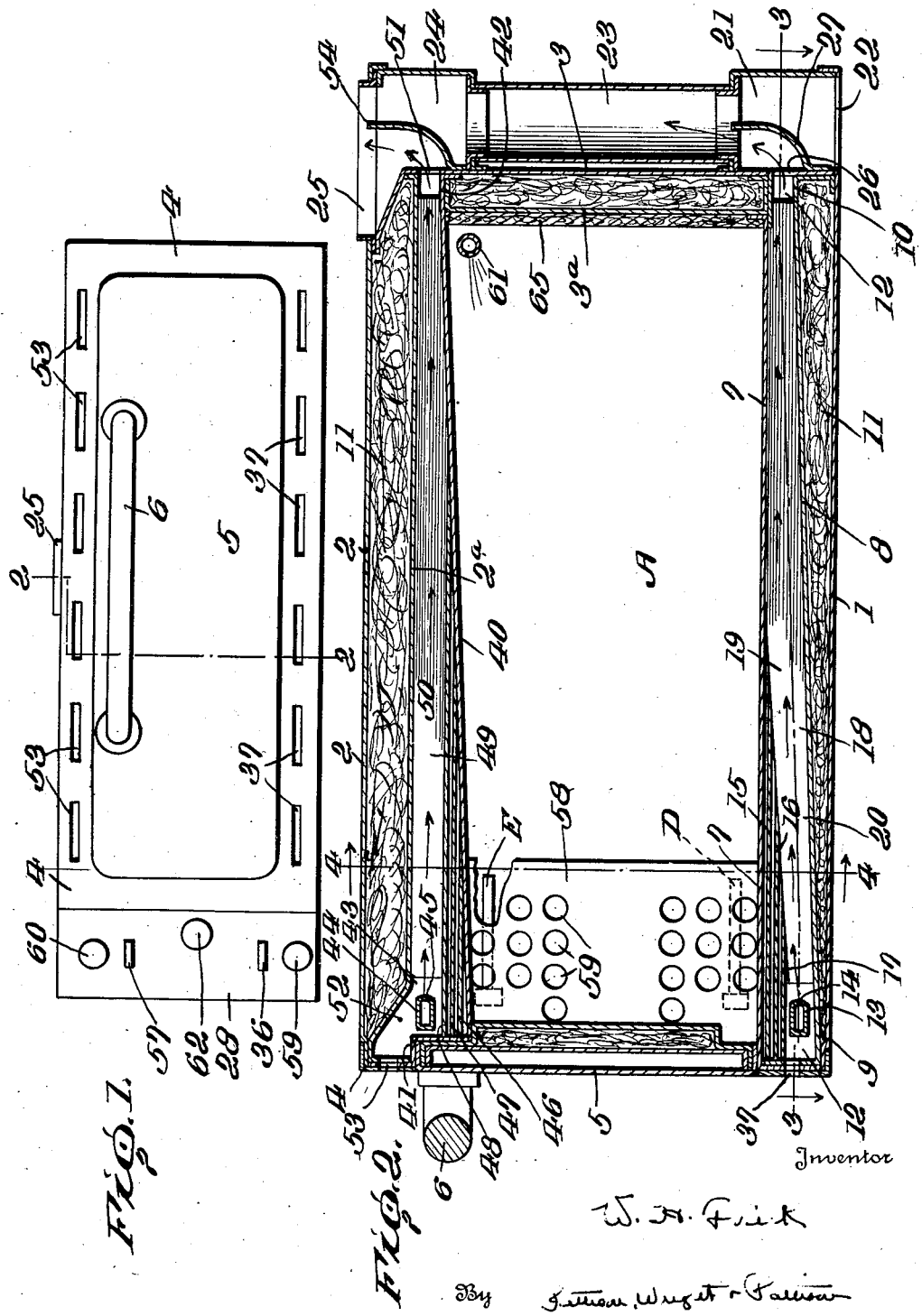

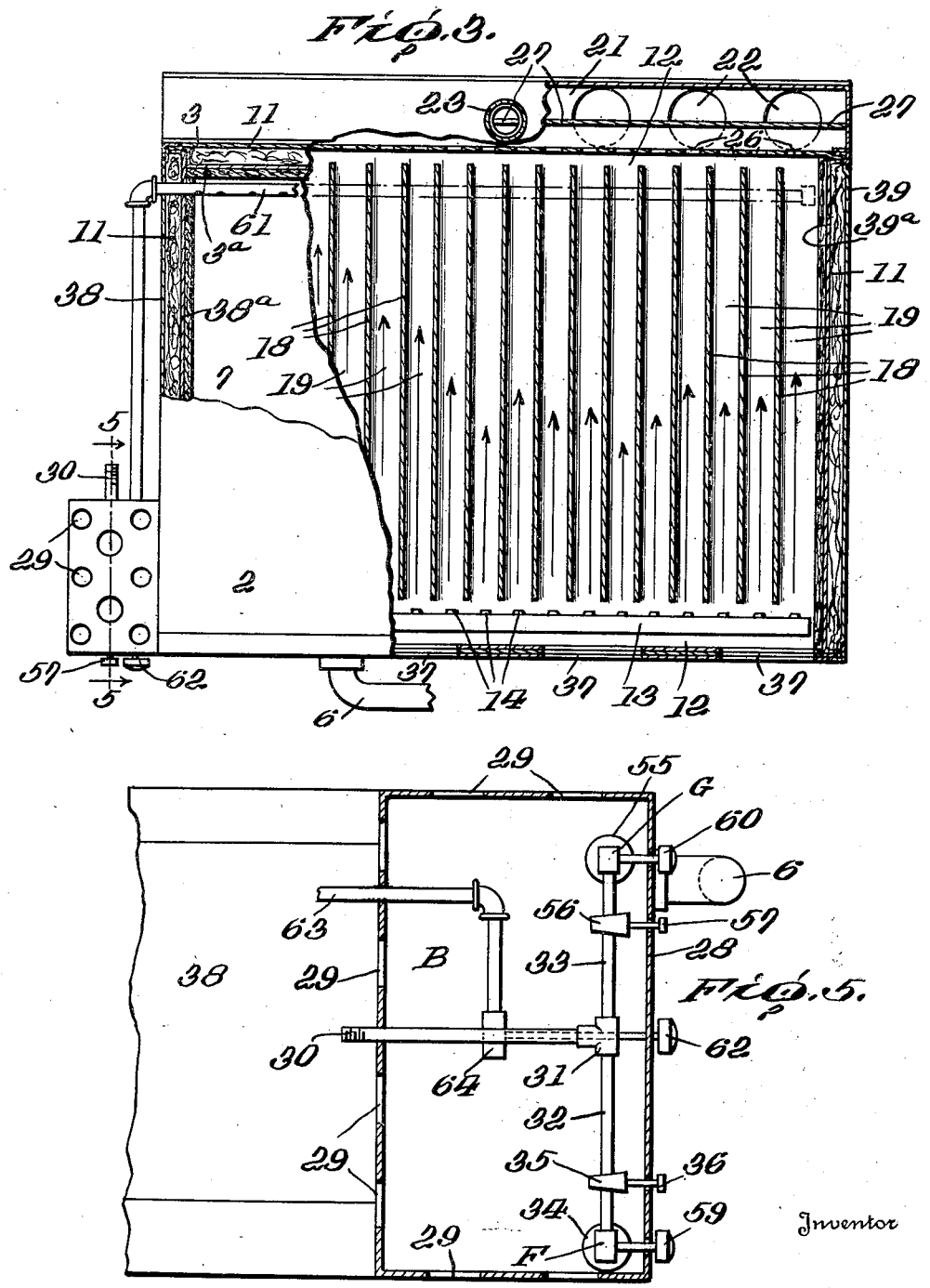

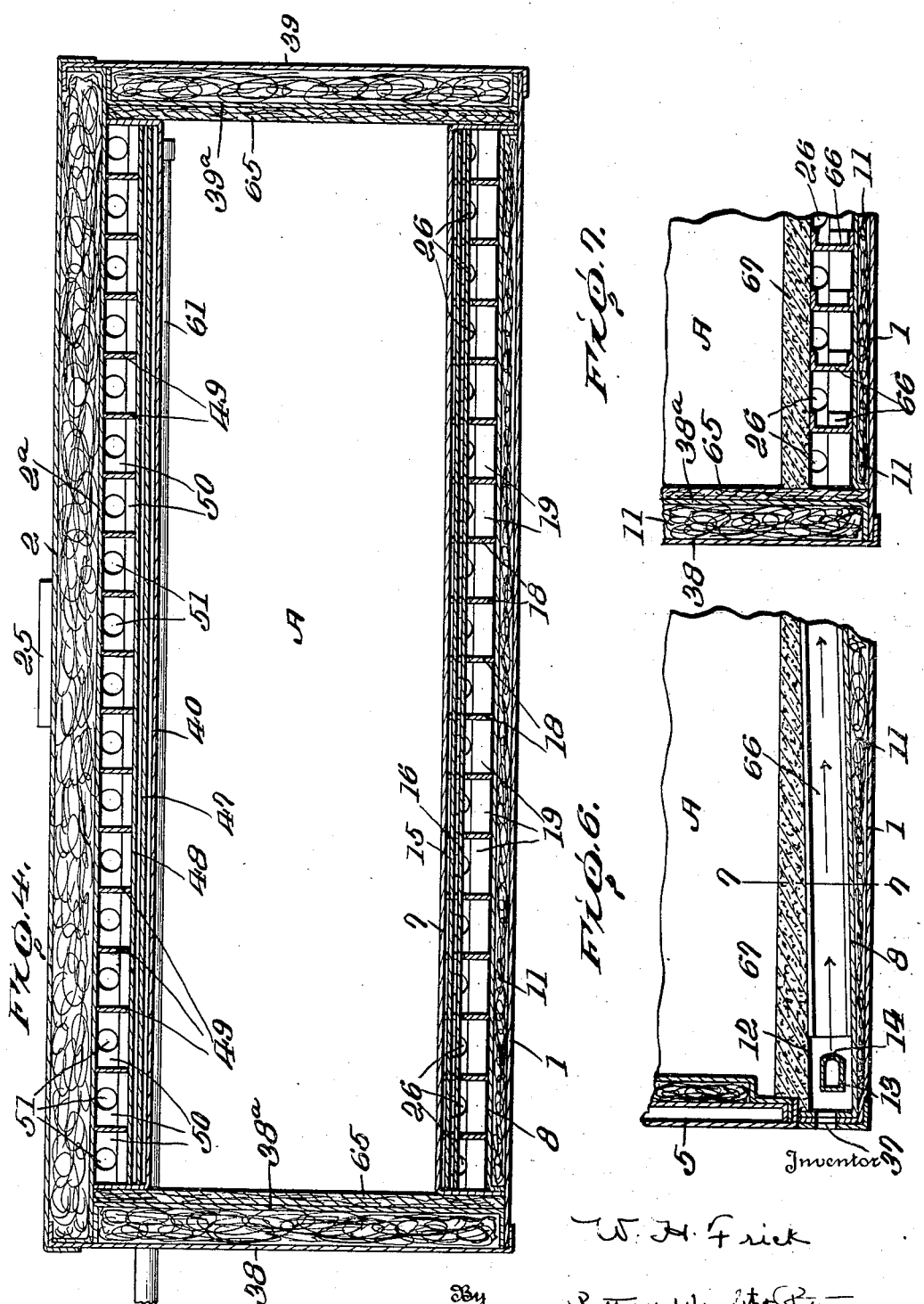

Patented Feb. 22, 1938

2,109,382

UNITED STATES PATENT OFFICE 2,109,382

OVEN

William H. Frick, Cleveland, Ohio, assignor to American Stove Company, St. Louis, Mo., a corporation of New Jersey Application March 10, 1937, Serial No. 130,205

13 Claims. (Cl. 126—273)

The present improved invention has as a primary object the provision of an oven constructed and arranged in a manner whereby not only separate and distinct control and maintenance of the temperatures in the top and bottom areas of the oven chamber can be obtained, but also an even distribution of heat to all portions of the top and bottom areas respectively of the oven chamber is obtained. An oven of this character is particularly desirable as within it it is possible to bake many different varieties of food some of which require different degrees of top and bottom heat or top heat only or bottom heat only. To provide an oven having the above attributes some of the specific features of the construction utilized are the elimination of side or back flues within the oven body for the purpose of avoiding radiated heat from the sides or back of the oven; an oven bottom and an oven top constructed in a novel and improved manner to cooperate with the oven burners; the use of distinct and separately controllable burners for heating the top and bottom areas respectively of the oven chamber, and the particular positioning of said burners to accomplish the desired result.

Among other specific objects of the invention is that of the provision of an oven chamber constructed in a manner to prevent to the greatest possible degree the escape of heated air when the oven door is opened; the provision of means to materially assist in the formation of crust on rolls, bread, or the like when the same is being baked in the oven; constructing the device in a manner whereby the oven is available as a single unit or as a unit in a tier of similarly constructed bake ovens, and the provision of thermostatic heat control means for the purpose of automatically maintaining in the particular oven chamber areas the desired and previously determined heat temperatures.

All of the particular and specific objects, novel features of construction and improved results of the invention have not heretofore been listed or described in detail but will appear and be fully understood from the following and accompanying description when read in the light of the illustrations appearing in the drawings which show a preferred embodiment of the invention.

In the drawings:

Fig. 1 is a front view of the improved bake oven.

Fig. 2 is a vertical sectional view taken on the line 2—2 of Fig. 1.

Fig. 3 is a horizontal sectional view taken on the line 3—3 of Fig. 2 looking in the direction indicated by arrows, a small portion of the figure in one corner appearing in full line.

Fig. 4 is a vertical sectional view taken on the line 4—4 of Fig. 2 looking in the direction indicated by arrow.

Fig. 5 is a vertical sectional view taken on the line 5—5 of Fig. 3.

Fig. 6 is a fragmentary detailed vertical sectional view illustrating a modified form of the invention.

Fig. 7 is a fragmentary vertical sectional view taken at right angles to Fig. 6 and on the line 7—7 of that figure.

Having reference now to the drawings in which a preferred and modified embodiment of the invention is illustrated in connection with a bake oven, the outer oven bottom, top, rear and front walls are designated at 1, 2, 3, and 4 respectively. An insulated door 5 of conventional form is provided with an operating handle 6 to provide access of the oven chamber A.

The oven bottom is designated at 7 and comprises a horizontally disposed plate extending through the entire area of the oven chamber and being suitably supported in place so that it is disposed a considerable distance above the outer oven bottom wall 1. The inner oven bottom wall or liner plate is designated at 8 and is arranged at an angle to horizontal in a manner whereby its front end 9 is its low end and its rear end 10 its high end. This inner oven bottom wall or liner is spaced from the outer wall 1 whereby the space between the walls can be filled with a suitable insulating material 11 to provide an insulated bottom for the oven structure.

By reason of the construction thus far provided a flue space 12 is present immediately beneath the oven chamber bottom plate 7 and this flue is tapered in that it is deeper at its front end than at its rear end. Positioned within this flue at its front end and extending entirely transverse thereof is a burner 13 having a plurality of burner orifices or jets 14 arranged in separated aligned relationship throughout the length of the burner. Immediately above this burner and arranged in separated parallel relationship one to the other and in respect to the oven chamber bottom 7 are a plurality of plates 15, 16 and 17. These plates are graduated in length in respect to one another the upper plate 15 being the longest and the lower plate 17 the shortest. These plates extend across the entire width of the oven chamber and the specific reason for this construction will be pointed out in detail hereinafter.

In addition to the above horizontally disposed plates there are within the flue space 12 a plurality of vertically disposed plates or partitions 18 which extend from a point adjacent the burner to a point adjacent the rear end of the flue space and form a plurality of individual flues 19 one each of which is disposed in alignment with each of the burner orifices or jets 14. It will be obvious that a plurality or group of burner orifices could be arranged in alignment with each flue or individual burner chamber 19. These vertical plates or partitions at their front ends are reduced in depth as indicated at 20 so as to extend beneath the several horizontally disposed plates 15, 16 and 17.

In the rear of the oven structure and extending entirely transverse thereof there is a lower flue box 21 having an opening 22 in its lower end and communicating through a pipe 23 with an upper flue box 24 which extends transverse the upper rear end of the oven structure and is provided with an outlet opening 25. The rear end of the flue chamber 12 communicates with the lower flue box 21 through a plurality of openings 26 one each of which is disposed in alignment with one of the independent flueways 19. A shield or deflector 27 is disposed within the lower flue box 21 in separated relationship to the openings 26.

The housing or chamber B is positioned at one end of the oven and has its front closed by a suitable panel 28 which panel is flush with the front wall 4 of the oven. This chamber in its top, rear, and bottom walls is provided with suitable air inlet openings 29 and a main gas supply conduit 30 which receives its fuel supply from any suitable source (not shown) extends into the chamber B and through a T-connection 31 communicates with branch fuel conduits 32 and 33. The branch conduit 32 supplies gas to a mixing bell 34 of the burner 13 and the fuel supply is primarily under the control of the valve 35 the operating handle 36 of which is positioned on the front panel 28. The primary air for the burner enters the chamber B through the openings 29 and passes to the burner 13 along with the gas as the gas is fed into the mixing bell or mixer tube 34 of the burner.

To provide secondary air for the lower burner a series of openings 37 are provided in the front wall 4 in spaced relationship throughout the lower portion of that wall at a point below the door 5. These openings 37, as clearly appear from the drawings, communicate with the front end of the lower flue 12 which flue at this point might be properly termed a burner chamber in that the burner 13 is disposed therein.

In this connection it might be mentioned at this point that although the space 12 has been described as a flue it might be equally well described as a burner chamber divided up into a plurality of independent burner chambers through the instrumentality of the several partition plates or walls 18.

To best accomplish the primary object of the present invention it is desirable that the oven chamber be fully insulated. To this end there is an inner rear wall 3a arranged in spaced relationship to the outer wall 3; an inner side wall 38a in spaced parallel relationship to the outer side wall 38, and an inner side wall 39a arranged in spaced parallel relationship to the outer side wall 39, and the spaces between these walls are filled with suitable insulating material 11.

The top of the oven structure is also insulated by providing an inner oven top plate 2a in spaced parallel relationship to the outer oven top 2 and filling the space between these walls or plates with suitable insulating material 11.

The oven chamber top is defined by a plate 40 which is arranged at an angle to the horizontal so that it slants upwardly and rearwardly from its front end towards its rear end, as clearly appears in Fig. 2 of the drawings. At its front end this plate is bent as indicated at 41 to provide a seat for the oven door 5 while its rear end is suitably connected to or supported upon the rear walls of the oven as indicated at 42. The oven chamber top plate 40 and the plate 2a are arranged in separated relationship to form above the oven chamber a burner or flue space 43 which is similar in construction to the space hereinbefore described as being beneath the oven chamber bottom plate 7.

A burner 44 extends entirely across the front end of the burner or flue space 43 and is provided at separated points throughout its length with a plurality of burner orifices or jets 45. Immediately beneath the burner and arranged in separated parallel relationship in respect to one another and spaced in respect to the oven chamber top plate 40 are a plurality of plates 46, 47 and 48. These plates are of graduated lengths the upper plate being the longer and the lower plate being the shorter. Above these plates and arranged in separated parallel relationship are a plurality of vertically disposed partition members 49 the disposition of which is such as to form between them a plurality of parallel rearwardly extending channels or passageways 50 one each of which is in alignment with one or more burner orifices or jets 45 of the burner 44.

At its rear end the space 43 the channelways 50 communicate with the upper flue box 24 through a plurality of openings 51 in the rear outer wall 3 of the oven while secondary air for the burner 44 is admitted into the forward enlarged portion 52 of the chamber 43 through a plurality of air inlet openings 53 arranged in separated aligned relationship in the oven front wall 4 at a point above the oven door 5. A baffle or shield 54 similar in construction and purpose to the hereinbefore described shield 27 is provided in the upper flue box 24 in separated relationship to the flue openings 51.

Gas for the upper burner 45 is supplied through the branch conduit 33 and is delivered to the mixing bell or tube 55 of the burner along with primary air from the interior of the chamber or control box B. Gas delivery to this burner is under the control of a valve 56 having a control handle 57 positioned on the outer face of the box panel 28.

For the purpose of having accurate control of the heat within the upper and lower portions or areas of the oven chamber an individual thermostatic control for the lower burner 13 and the upper burner 44 is provided. The heat delivered by the lower burner is under the control of the thermostat D and the heat delivered by the upper burner is under the control of the thermostat E. It will be seen that these thermostats are disposed in the adjacent front ends of the oven chamber and extend rearwardly therein in parallelism to one of the side walls of the chamber with one thermostat being adjacent the oven chamber bottom and the other thermostat being adjacent the oven chamber top. These thermostats are shielded by a vertically disposed plate 58 having therein a plurality of openings 59 whereby the heat within the oven chamber can freely reach and circulate around the thermostats.

The thermostatic control of heat within the chamber is not broadly new and the manner in which the thermostatic controls operate to effect the proper regulation of the heat delivering medium is well understood and need not be here described in detail. It is thought sufficient to state that F indicates the control mechanism which is operated by the thermostat D for controlling the lower burner 13 and that G indicates the controlling mechanism operated by the thermostat E for controlling the upper burner 44. For the purpose of setting the control mechanisms F and G setting handles or dials 59 and 60 respectively are positioned on the front panel 28 of the control box B.

The crusting of bread, rolls and the like can be greatly facilitated by the injection of steam into the oven chamber in which they are being baked, and accordingly in the present invention a perforated steam pipe 61 extends across the top of the rear of the oven chamber and the delivery of steam from this pipe is under the control of a valve handle 62 positioned on the front panel or plate 28 of the control box. A conduit 63 is connected to some suitable source of steam supply (not shown) and in the connection of this conduit to the pipe 61 there is a suitable valve 64 under the control of the aforementioned valve handle 62.

Although the matter of its use is optional the inner oven sides and rear are illustrated as being lined with a suitable insulating material 65 to prevent radiation of heat and overbaking in those areas adjacent the oven sides and rear.

In respect to the heretofore described plates 15, 16, 17, 46, 47 and 48, although three of these plates are illustrated as being present in each burner chamber it is to be recognized that their number can be increased or diminished as desired and that although the air space between the plates is illustrated as being open this space could be readily converted into a closed air space or the air space between the plates could be ventilated and if desired the space between the plates could be filled with suitable insulating material or members.

It is also to be recognized that the thermostats need not be located specifically as illustrated and described but could be located differently in the oven chamber without departing from the spirit of the invention, and as a matter of fact might be located in the burner chambers or flueways rather than in the oven chamber proper. The shields illustrated as used in combination with the regulators can be dispensed with if desired.

In place of the elongated perforated steam pipe 61 a single jet steam inlet could be provided within the baking chamber and made to accomplish the desired result.

It has been found that an oven constructed in the manner hereinbefore described will accomplish the desired results in that the plates 15, 16, 17, 46, 47 and 48 prevent overheating the upper and lower front areas of the oven chamber which are immediately adjacent the upper and lower burner. It will be seen that the greatest shielding affect of these devices is immediately below and above the respective burners and their shielding affect tapers off in a direction away from the burners just as the temperature of the hotness of the products of combustion will reduce as they travel away from the burners.

The individual burner chambers or flueways extending from the burner orifices of the burner assure an equal distribution of heat from each burner in a direction from side to side of the oven chamber at its top and its bottom and in a manner to make it possible to obtain even heat distribution to the oven chamber top area or bottom area in accordance with the desires of the operator, it being understood of course that the device can be operated to obtain different heat temperatures in the bottom and top areas of the oven chamber.

The admission of secondary air and the flue boxes at the exterior of the rear of the oven is such as to cause the hot products of combustion to flow from the burners rearwardly along and through the individual burner chambers or flue channelways and to make for an even and thorough distribution or application of heat to the plates comprising the top and bottom of the oven chamber.

In ordinary ovens the tendency upon the opening of the oven door is for the hot air to rush outwardly through the door opening, which is of course undesirable. It has been found that with the provision of an oven chamber top which slants upwardly and rearwardly as in the present invention the tendency of hot air to rush outwardly from the oven chamber when the oven door is opened, is materially reduced.

By the provision of individual burners above and below the oven chamber and the positioning of them in individual burner chambers having no communication with the oven chamber it is possible through the use of individual thermostatic controls operable by the heat in the bottom and top respectively of said chamber to control the temperature in the bottom and top of said chamber, which is of course highly advantageous in enabling the best possible use of the oven in baking operations.

Figs. 6 and 7 illustrate a modified form of the invention and although only the oven bottom appears in these figures it is to be understood that the oven top and upper burner chamber will be similarly constructed.

By reference to Figs. 6 and 7 of the drawings it will be seen that the vertically disposed and longitudinally extending partitions which divide the burner chamber or flue space into a plurality of parallel channelways are in the form of channel irons 66 and that the oven chamber bottom or deck is in the form of fire brick 67 which is of graduated thickness whereby immediately above the burner the deck is of maximum thickness and tapers as to thickness rearwardly towards the rear end of the oven. An oven constructed in this manner obviates the necessity of the use of the plates 15, 16, 17, 46, 47 and 48, appearing in the preferred form of the invention, yet will function in a similar manner to prevent overheating of the oven chamber immediately adjacent the burners.

It is to be recognized that the oven top and bottom need not necessarily be composed of fire brick but could take the form of a steel, aluminum, or other metal plate of tapering thickness. It will be obvious that the angle irons or bars 66 would prove adequate to support oven tops or bottoms of either of the constructions just described.

In practice it is sometimes found desirable to utilize a plurality of bake ovens and when this is done it is also found desirable to arrange the ovens in tiers, that is to say, stack the ovens one upon the other. It should be obvious that the present improved oven has been designed to make it possible to use it or a series of them so arranged. When one oven is superimposed upon the other the opening 22 in the lower flue box of the upper oven will register and communicate with the flue opening 25 in the upper flue box of the lower oven to form a continuous flue or outlet chimney for as many ovens as may be arranged in superimposed relationship.

I claim:

1. An improved oven, comprising a housing, an oven chamber in said housing, individual burner chambers above and below said oven chamber and substantially coextensive therewith, a plurality of vertically disposed partitions within said burner chambers and arranged in separated substantially parallel relationship to provide a plurality of longitudinally extending individual passageways above and below said oven chamber, a burner adjacent the front end of each of said burner chambers extending transversely thereof, each burner being provided with a plurality of burner orifices arranged in separated relationship throughout the length of the burner, a burner orifice being in alignment with one of the aforementioned passageways, a fuel supply for the burners, a door for the oven chamber, and flue outlet means for each of said burner chambers.

2. An improved oven, comprising a housing, an oven chamber therein, burner chambers above and below said oven chamber and substantially coextensive therewith, a burner in each of said burner chambers, a fuel supply for said burners, a series of plates in each burner chamber positioned between the burner and the oven chamber, the plates in each chamber arranged in parallel separated relationship in respect to one another and in separated relationship to the oven chamber top and bottom respectively, a door for said oven chamber, and flue outlet means for each burner chamber.

3. An improved oven, comprising a housing having an oven chamber therein, individual burner chambers above and beneath said oven chamber and substantially coextensive therewith, a burner positioned adjacent the front end of each of said burner chambers, means positioned between the burners and the oven chamber top and bottom respectively to prevent localized overheating of the oven chamber immediately adjacent said burners, flue outlet means at the rear of said burner chambers, secondary air inlets communicating with said burner chambers, an independently controllable fuel supply for each burner, automatic temperature regulating means including a thermostat element for controlling the fuel delivery individually to each burner, and the thermostat element controlling the upper burner being positioned in the upper front end of the oven chamber and the thermostatic element controlling the lower burner being positioned in the lower front end of the oven chamber.

4. An improved oven, comprising a housing having an oven chamber therein, individual burner chambers above and beneath said oven chamber and substantially coextensive therewith, a plurality of vertically disposed partitions within said burner chambers and arranged in separated substantially parallel relationship to provide a plurality of longitudinally extending individual passageways within said burner chamber, a burner adjacent the front end of each of said burner chambers and extending transversely thereof, each burner being provided with a burner orifice in approximate alignment with each of the aforementioned passageways, means disposed between said burners and the top and bottom walls of said oven chamber to prevent localized overheating of the oven chamber immediately adjacent the burners, a fuel supply for the burners, a door for the oven, and flue outlet means for each of said burner chambers.

5. An improved oven, comprising a housing having an oven chamber therein, individual burner chambers above and below the top and bottom respectively of said oven chamber and substantially coextensive therewith, a plurality of vertically disposed partitions within said burner chamber and arranged in separated substantially parallel relationship to provide a plurality of longitudinally extending individual passageways within said chamber, a burner adjacent the front end of each burner chamber and extending transversely thereof, each burner being provided with a burner orifice arranged substantially in alignment with each of the aforementioned passageways, a fuel supply for the burners, a door for the oven chamber, flue outlet means for each burner chamber adjacent the rear end thereof, and the top and bottom of said oven chamber being tapered as to thickness with the thickest portions thereof being positioned immediately adjacent the burners and between them and the oven chamber and the thinner portions thereof remote to the burners and adjacent the flue outlets for said burner chambers, the parts operating as and for the purpose described.

6. An improved cooking device, comprising a housing having an oven chamber therein, individual and non-communicating burner chambers above and below said oven chamber, a burner in each of said burner chambers and a gas supply therefor, a thermo responsive means positioned to be responsive to the heat delivered by the burner in the lower burner chamber for controlling the supply of fuel to the burner in said chamber, thermo responsive means positioned to be responsive to the heat delivered by the burner in the upper burner chamber for controlling the supply of fuel to the burner in said chamber, and means to individually set said thermo responsive means to obtain the desired heat delivery from said burners, whereby separate and distinct control and maintenance of the temperature in the top and bottom areas in the oven can be obtained.

7. An improved cooking device, comprising a housing having an oven therein, individual non-communicating burner chambers above and below said oven chamber, a burner in each of said burner chambers, a fuel supply for each of said burners, means to individually control the supply of fuel to each of said burners, means in each of said burner chambers to prevent localized overheating of the oven chamber immediately adjacent the burners, a plurality of flueways in each of said burner chambers to assure an even and complete distribution of heat to all portions of the top and bottom of said oven chamber, and an outlet flue for each of said burner chambers so disposed as to assure the travel of hot products of combustion through all of said flue-ways.

8. An improved cooking device, comprising a housing having an oven chamber therein, individual non-communicating burner chambers above and below said oven chamber, said upper and lower burner chambers being substantially coextensive with the top and bottom of the oven chamber and each chamber definitely confined within the area above and below the oven top and bottom respectively, an outlet communicating with each of said chambers, a burner in each of said burner chambers, and means to individually control the supply of fuel to each of said burners.

9. An improved cooking device, comprising a housing having an oven therein, individual noncommunicating burner chambers above and below said oven, a burner positioned adjacent one end of each of said chambers, a plurality of heat conducting passageways in each of said burner chambers extending from said burners to the other end of said chambers, and an outlet in each of said chambers communicating with those ends of the heat passageways which are remote to the burner.

10. An improved cooking device, comprising a housing having an oven chamber therein, individual burner chambers above and below said oven chamber, a burner extending across one end of each of said burner chambers, a plurality of passageways in each of said burner chambers extending from said burners to a point of discharge and each burner being provided with at least one burner orifice disposed opposite each of the passageways of its respective burner chamber.

11. An improved oven, comprising a housing having an oven chamber therein, a burner chamber exterior of and at one side of said oven chamber and substantially coextensive therewith, a plurality of partitions within said burner chamber to provide a plurality of heat passageways extending across the burner chamber, a burner adjacent and extending across one end of each of said heat passageways and being provided with at least one burner orifice in substantial alignment with each of said aforementioned passageways, and said burner chamber provided with an outlet opening adjacent the opposite ends of said heat passageways.

12. An improved oven, comprising a housing having an oven chamber therein, a burner chamber within said housing and at one side of said oven chamber, a burner in said burner chamber, a series of plates in said burner chamber positioned between the burner and the oven chamber, arranged in substantially parallel separated relationship in respect to one another and in separated relationship to the adjacent oven chamber wall, a fuel supply for said burner, flue outlet means for said burner chamber, and a door for said oven chamber.

13. An improved oven, comprising a housing having a top and bottom, an oven chamber intermediate the housing top and bottom, a burner chamber above the oven chamber and a burner chamber below the oven chamber, a burner in each of said chambers, a vertically extending outlet flue at the rear of said housing and having communication with each of said burner chambers, said outlet flue at its lower end provided with an opening and having its upper open end provided with a collar, whereby a pair of ovens can be arranged in superposed relationship with the outlet flue pipes at their rear ends in communication with one another and forming a continuous outlet flue pipe.

WILLIAM H. FRICK.